Oct. 27, 1925.
B. H. FREELAND
TIRE CARRIER
Filed Feb. 28, 1925
1,559,414
2 Sheets-Sheet 1
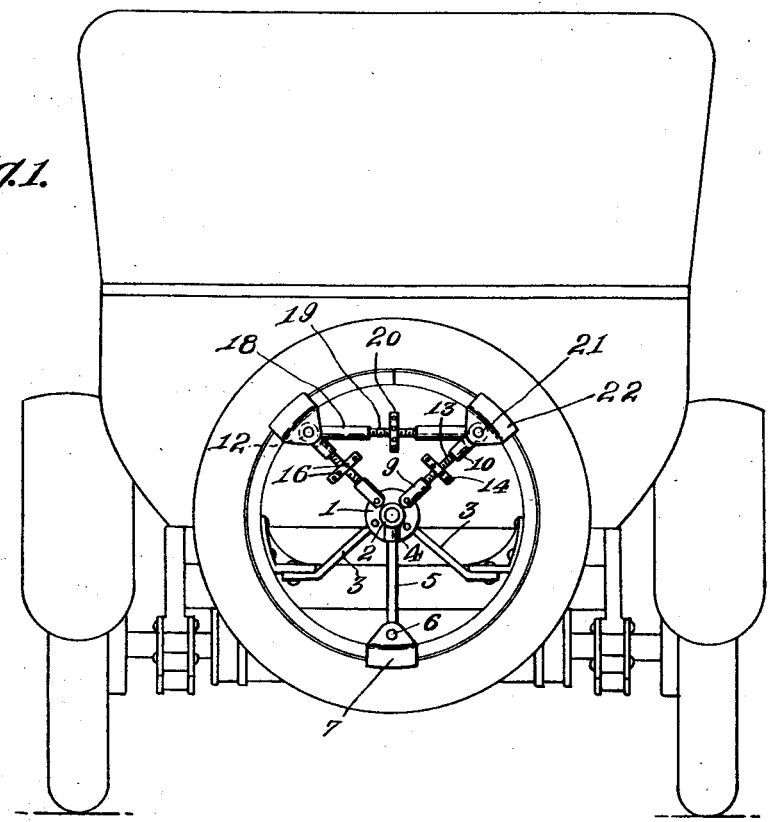
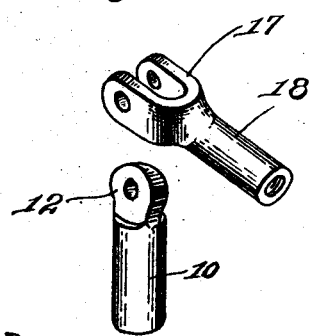
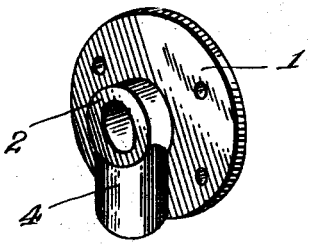
B. H. Freeland
INVENTOR
BY Victor J. Evans
ATTORNEY
WITNESS:

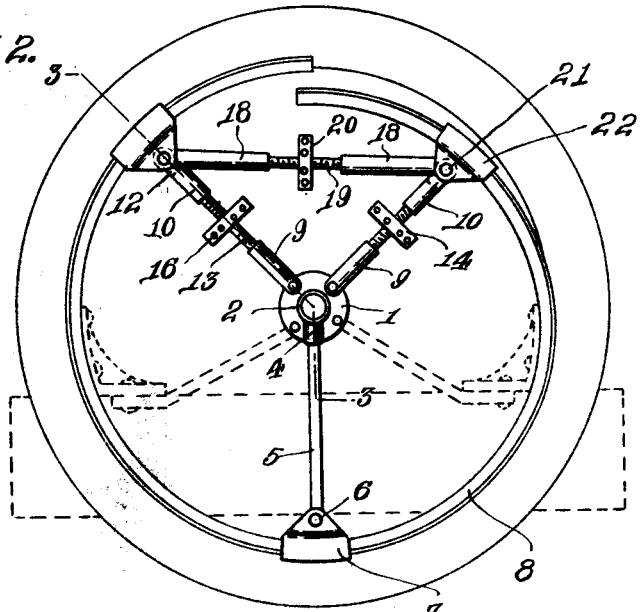
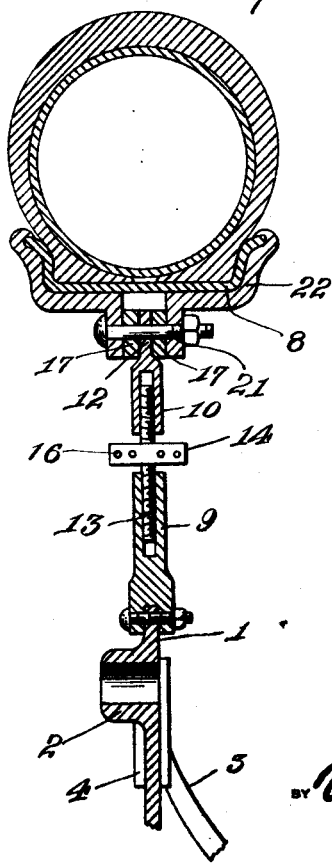

Patented Oct. 27, 1925.

1,559,414

UNITED STATES PATENT OFFICE.

BEN H. FREELAND, OF PERU, INDIANA.

TIRE CARRIER.

Application filed February 28, 1925. Serial No. 12,389.

*To all whom it may concern:*

Be it known that I, BEN H. FREELAND, a citizen of the United States, residing at Peru, in the county of Miami and State of Indiana, have invented new and useful Improvements in Tire Carriers, of which the following is a specification.

My present invention has reference to a combined spare tire carrier for automobiles and to a means for expanding or contracting tire rims.

My primary object is the provision of a device for this purpose which can be readily attached to the rear or other part of an automobile for supporting a spare tire thereon to firmly support the tire, and likewise operable to expand or contract the rim of the tire without necessitating the removal of the device from the automobile.

A further object is the provision of a device of this character in which a support is provided with radially disposed arms, each having pivotally secured thereto tire rim engaging clamps, the outer arms being longitudinally adjustable whereby the same may be expanded or contracted to expand or contract the tire rim or to hold the said rim firmly on the device, adjustable means being arranged between the said last mentioned arms for drawing the same toward or moving the same from each other to facilitate the initial movement of the split ends of the tire rim, and likewise sustaining the said arms properly associated with respect to each other and with respect to their engagement with the rim.

In the drawings which accompany and form part of this application, there is illustrated a satisfactory embodiment of the improvement, and wherein:—

Figure 1 is a rear elevation of an automobile provided with the improvement.

Figure 2 is an elevation of the improvement showing the manner in which the rim is contracted.

Figure 3 is a sectional view on the line 3—3 of Figure 2.

Figure 4 is a perspective view of the ends of one of the expansible arms and the member to which it is pivoted.

Figure 5 is a perspective view of the support.

As is well known, spare tires are supported on automobiles in various manners, as for instance some machines are equipped with brackets, while others carry stub shafts for the tire supporting means. Therefore, it is to be understood that I am not to be restricted to the application of my improvement to any particular support, but it will be also apparent that my device may be attached to either a stub axle or to a bracket.

In carrying out my invention I make use of a disk member 1, which I shall term a support. The member 1 is centrally formed with a hub 2. This hub may receive therethrough the stub axle when such is employed on an automobile, but the support is also provided with spaced openings for the reception of bolts or similar means whereby the same may be attached to brackets 3. The support 1, from its hub 2, is formed with a socket 4, and in this socket there is received one end of an arm 5. The second end of the arm is pivotally secured, as at 6, between inner and outer jaw members 7 respectively. The jaws have their outer edges flanged and notched to engage with and to receive in the notches thereof the beaded edges of the tire carrying rim 8.

The pivot means 6 is in the nature of a bolt engaged by a nut, whereby the jaw members 7 may be forced toward each other or released.

The disk support 1 has pivotally secured thereto other arms. These arms are spaced an equi-distance from the center adjacent to the upper edge of the hub 4. The arms include inner and outer sections 9 and 10 respectively. Both of these sections are in the nature of socket members, the inner sections 9 having their ends bifurcated to straddle the disk support 1 and are provided with openings for the reception of pivot elements 11 which, of course, also pass through the disk. The outer members 10 have flattened head portions 12, and both of the members 10 and 11 have their sockets threaded, the said threads being arranged at different hand pitches. Received in the threaded sockets of the members 9 and 10 there are the right and left hand pitch threads on a screw member 13. The screw member is centrally formed with a head 14 which is round in plan and which is peripherally provided with notches 16. The notches are designed to receive a suitable instrument therein for turning the screw and adjusting the sections of the arms with respect to each other.

Straddling the heads 12 of the outer members 10 of the upper arms are the bifurcated ends 17 of socket members 18. The sockets of the members 18 are directed toward each other, and these sockets are provided with right and left hand threads respectively, the said threads being engaged by right and left hand threads on a screw member 19. The screw is centrally formed with a head 20 which is round in plan and which is provided with peripheral notches for the reception of a suitable instrument for turning the screw and adjusting the socket members 18 with respect to each other. The socket members of the screw provide what may be termed the upper adjustable arm of the improvement.

Passing through aligning openings in the bifurcated end 17 of the socket members 18 and through similar openings in the heads 12 of the arms 10 there are pivot members 21. These pivots also pass through openings in clamps 22. The clamps are similar to the clamps 7, the same being arranged in pairs and the pivot 21 is preferably in the nature of a bolt engaged by a nut whereby the clamps 22 may be adjusted toward or away from each other.

The simplicity of the construction and the operation thereof will, it is thought, be apparent to those skilled in the art to which such inventions relate. It is obvious that by regulating the adjustable angle arms the clamps 22 may be moved to firmly lock the rim on the carrier. A lateral or side movement is provided for by the adjustment of the upper horizontal arm. By adjusting this arm and one of the upper angle arms, it will be obvious that the split tire carrying rim may be expanded or contracted. It is, of course, to be understood that I do not desire being restricted to the precise features of construction herein set forth and therefore hold myself entitled to all such changes therefrom as fall within the scope of what I claim.

Having described the invention, I claim:—

1. A combined spare tire carrier and rim expander for automobiles including a support having a socket, an arm having one end in the socket, a two-part rim engaging clamp adjustably secured on the arm, upwardly inclined radially disposed arms pivotally secured on the support comprising inner and outer socket members having threaded bores of different hand pitches, a screw having its end provided with different hand pitches received in the sockets, an apertured head centrally on the screw, two-part rim engaging clamps on the outer sockets, and binding means between said clamps and said sockets.

2. A combined spare tire carrier and rim expander for automobiles including a support having a socket, an arm having one end in the socket, a two-part rim engaging clamp adjustably secured on the arm, upwardly inclined radially disposed arms pivotally secured on the support comprising inner and outer socket members having threaded bores of different hand pitches, a screw having its end provided with different hand pitches received in the sockets, an apertured head centrally on the screw, two-part rim engaging clamps on the outer sockets, binding means between said clamps and said sockets, horizontally disposed socket members pivoted respectively to the last mentioned outer sockets, said horizontal sockets having their bores provided with different hand threads, a screw having different hand threads received in said sockets, and an apertured head arranged centrally on the screw.

In testimony whereof I affix my signature.

B. H. FREELAND.